(12) United States Patent
Schunicht et al.

(10) Patent No.: US 9,292,547 B1
(45) Date of Patent: Mar. 22, 2016

(54) COMPUTER DATA ARCHIVE OPERATIONS

(75) Inventors: Geoffery A Schunicht, Spring, TX (US); Sadasivan Asha, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1452 days.

(21) Appl. No.: 12/693,925

(22) Filed: Jan. 26, 2010

(51) Int. Cl.
*G06F 17/30* (2006.01)

(52) U.S. Cl.
CPC .................................... *G06F 17/303* (2013.01)

(58) Field of Classification Search
CPC ...................................................... G06F 17/303
USPC ........................................................ 707/661
See application file for complete search history.

(56) References Cited

U.S. PATENT DOCUMENTS

| | | | |
|---|---|---|---|
| 5,150,473 A | 9/1992 | Zulch | |
| 5,325,519 A | 6/1994 | Long et al. | |
| 5,402,474 A | 3/1995 | Miller et al. | |
| 5,926,836 A | 7/1999 | Blumenau | |
| 6,378,054 B1 | 4/2002 | Karasudani et al. | |
| 6,397,307 B2 | 5/2002 | Ohran | |
| 6,460,123 B1 | 10/2002 | Blumenau | |
| 6,510,432 B1 | 1/2003 | Doyle | |
| 6,711,594 B2 | 3/2004 | Yano | |
| 7,225,249 B1 * | 5/2007 | Barry et al. | 709/227 |
| 7,353,236 B2 * | 4/2008 | Stickler | |
| 7,886,031 B1 * | 2/2011 | Taylor et al. | 709/221 |
| 2002/0194523 A1 * | 12/2002 | Ulrich et al. | 714/4 |
| 2003/0093403 A1 * | 5/2003 | Upton | 707/1 |
| 2003/0163568 A1 * | 8/2003 | Kano et al. | 709/225 |
| 2004/0225645 A1 * | 11/2004 | Rowney et al. | 707/3 |
| 2005/0027723 A1 * | 2/2005 | Jones et al. | 707/100 |
| 2005/0033777 A1 * | 2/2005 | Moraes et al. | 707/202 |
| 2005/0234867 A1 * | 10/2005 | Shinkai | 707/1 |
| 2005/0256908 A1 * | 11/2005 | Yang et al. | 707/200 |
| 2006/0047720 A1 * | 3/2006 | Kulkarni et al. | 707/204 |
| 2007/0214143 A1 * | 9/2007 | Koarashi | 707/8 |
| 2007/0250531 A1 * | 10/2007 | Wiggins et al. | 707/102 |
| 2008/0104046 A1 * | 5/2008 | Singla et al. | 707/4 |
| 2008/0183776 A1 * | 7/2008 | Kulkarni et al. | 707/204 |
| 2008/0262959 A1 * | 10/2008 | Tupper et al. | 705/37 |
| 2009/0031153 A1 * | 1/2009 | Bahali et al. | 713/310 |
| 2009/0144344 A1 * | 6/2009 | McBride et al. | 707/204 |
| 2009/0164565 A1 * | 6/2009 | Underhill | 709/203 |
| 2009/0182876 A1 * | 7/2009 | Hayashi | 709/225 |
| 2010/0074124 A1 * | 3/2010 | Peterman et al. | 370/252 |

* cited by examiner

*Primary Examiner* — Syling Yen
(74) *Attorney, Agent, or Firm* — Hewlett Packard Enterprise Patent Department

(57) ABSTRACT

An archive operation selected from a set comprising: an export operation, an import operation, and a combination export and import operation is initiated. The archive operation involves a transfer of data. During the archiving operation, some of the data is replaced.

20 Claims, 4 Drawing Sheets

COMPUTER DATA ARCHIVE OPERATIONS

BACKGROUND

Centrally managed computer systems can provide for migration of the functionality of one managed computer to another. Thus, for example, a database function can be upgraded by installing the database application on more capable hardware; a central management server (CMS) can then switch queries and access to an externally stored database from an existing installation to the new installation.

This capability of a CMS to manage migration from one managed server to another does not extend to the management functionality itself. The management function is typically handled cooperatively by a plurality of management applications, each of which may store data in various places. For example, a management application can store management-related data in a database, in a configuration file, in a log file, and in other types of files. The related information can include identities of the managing and managed systems, passwords, performance, utilization data, and database schema.

In practice, much of this data is not transferred when the CMS hardware is upgraded. Instead, the management related data must be regenerated. Some of the regeneration can be automated, e.g., as in the collection of performance and utilization data. However, even then, a performance hit may result as it can take some time to recollect performance and utilization data used to optimize a system. Other types of management data, e.g., network names and addresses, may have to be reset manually.

DETAILED DESCRIPTION

Figure 1:
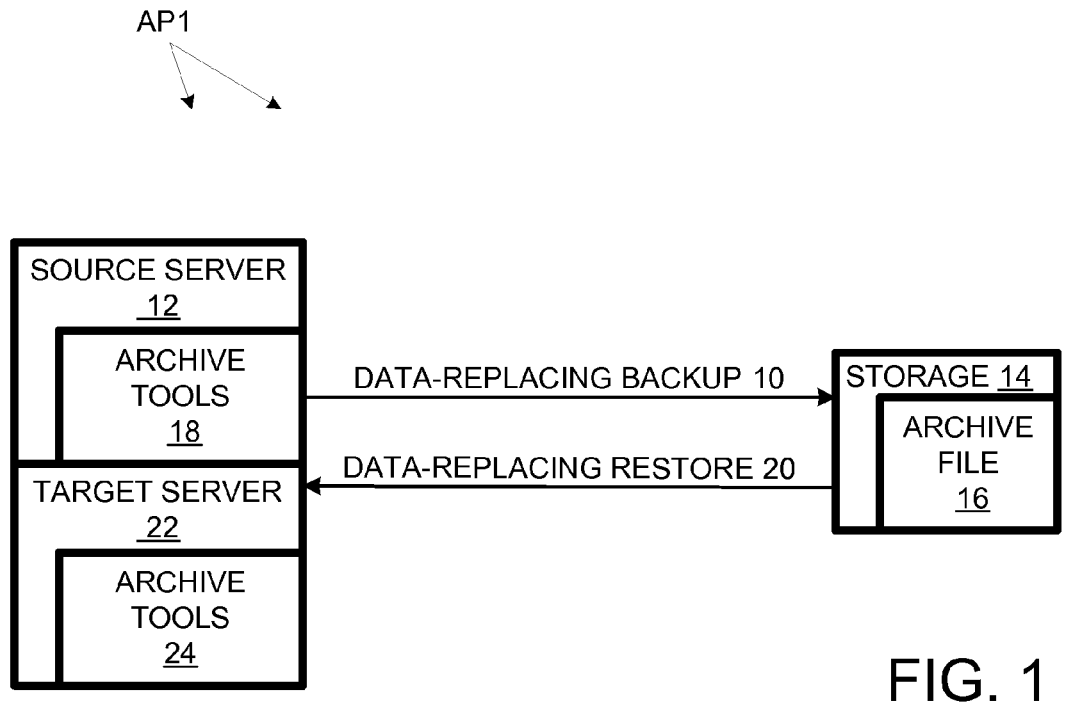
FIG. 1 is a schematic diagram of a computer system in accordance with a first system embodiment.

A system AP1, shown in FIG. 1, provides for data-replacing archive operations. As explained further below, these data-replacing archive operations can facilitate migrations of data from one central management server to another. For example, a migration can be effected by performing a data-replacing backup from a source CMS followed by a data-replacing restore to a target CMS. Accordingly, the burdens of manually replacing management data and waiting for historical performance and utilization to accumulate are reduced.

"Archive operation" herein encompasses backup operations, restore operations and combinations (e.g., export followed by import) thereof. "Data replacing" implies that the information represented by data is changed, as opposed to mere changes in the form or arrangement of data. Thus, encryption and compression are not in and of themselves data replacing operations as they affect the form of the data but not the underlying information. Likewise, adding information (e.g., time and data of an archive operation) or deleting information by themselves would not qualify as "data replacing". Depending on the embodiment, operations such as adding data, deleting data, and changing the arrangement and/or form of the data may be provided.

System AP1 provides: 1) a data-replacing backup/export operation 10 from a source server 12 to storage 14 so as to generate an archive file 16 as implemented by archive tools 18; 2) a data-replacing restore/import operation 20 from an archive file 16 to a target server 22 as implemented by archive tools 24; and/or 3) a data-replacing combined operation, e.g., where data is deleted on export and replacement data is inserted upon import. Depending on the embodiment, source server 12 and target server 18 can be the same or different servers.

Figure 2:
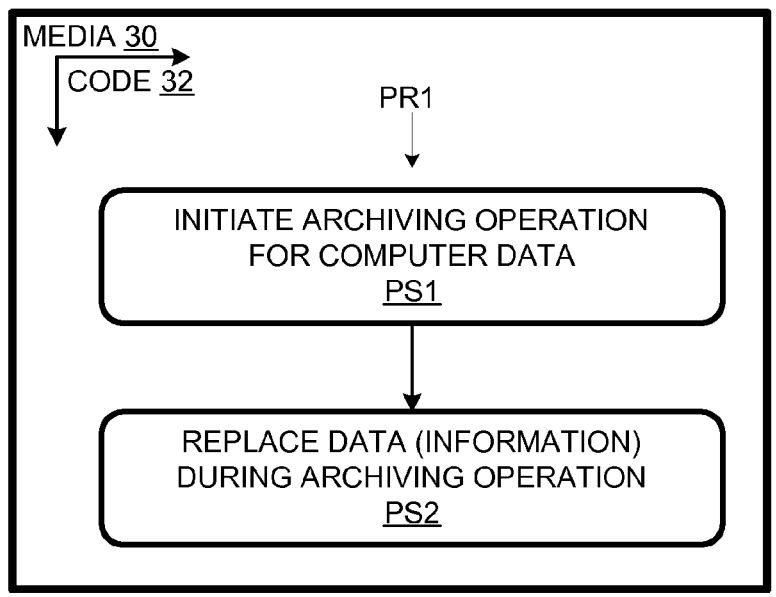
FIG. 2 is a flow chart of an archive process in accordance with a first process embodiment.

System AP1 includes computer-readable storage media 30, FIG. 2, including storage 14 as well as storage local to servers 12 and archive tools 22. Media 30 is encoded with code 32 which provides for a process PR1, as well as for tools 18 and 24. Process PR1 includes a process segment PS1 which involves initiating a data-replacing archive operation. For example, a computer administrator can initiate a backup or restore operation via a command-line interface. At process segment PS2, data is replaced during the archiving operation. For example, an identifier associated with a source server can be replaced by an identifier for a target server during a restore operation.

Figure 3:
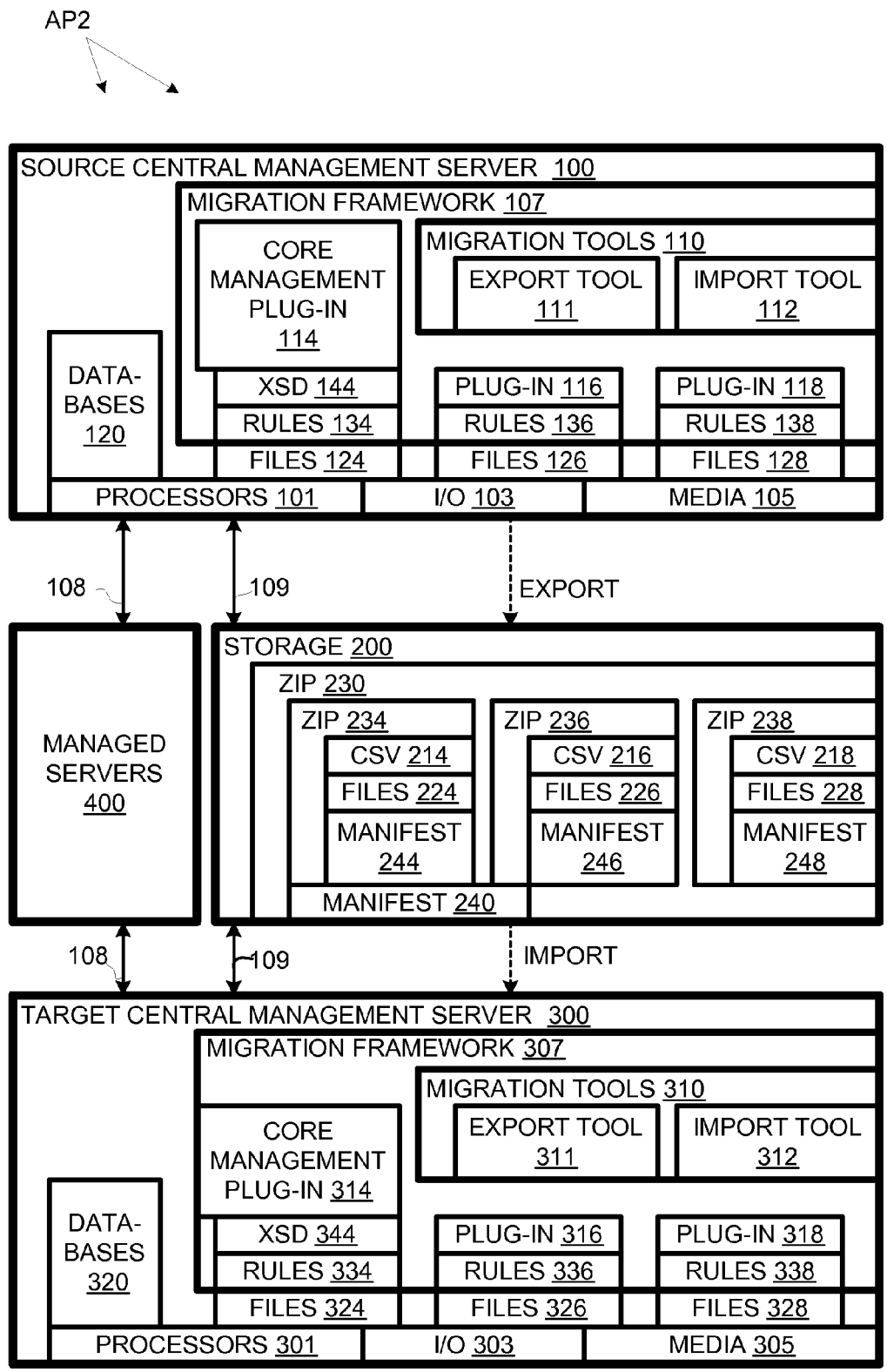
FIG. 3 is a schematic diagram of a computer system in accordance with a second system embodiment.

A CMS migration scenario is explained with reference to system AP2 of FIG. 3. System AP2 includes a source CMS 100, computer readable storage 200, a target CMS 300, and managed servers 400. Source CMS 100 includes processors 101, communications (I/O) devices 103, and computer-readable storage media 105. When operational, CMS 100 communicates with management servers 400 over a server network 108 and with storage 200 over a network 109, which can be a storage array network. Likewise, when operational, CMS 300 communicates with management servers 400 over a server network 108 and with storage 200 over a network 109. Media 105 is encoded with a migration framework 107, databases 120, and plug-in specific files 124, 126, and 128.

Framework 107 provides migration/archive tools 110 including export tool 111 and import tool 112. Framework 107 manages a core-management plug-in 114, and ancillary plug-ins 116 and 118. Core-management plug-in 114 can be, for example, the Hewlett-Packard System Insight Manager (HPSIM), available from Hewlett-Packard Company. While two ancillary plug-ins are shown, system AP2 can accommodate any number of plug-ins. Examples of ancillary plug-ins include Virtual Connect Enterprise Manager (VCEM), Insight Power Management (IPM), and Performance Management Pack (PMP), all available from Hewlett-Packard Company. In addition, framework 107 provides access to one or more databases 120, each of which can be used by one or more of the plug-in.

Depending on the nature of the plug-in, various types of data may be involved in a migration. The data can involve user-defined tasks, credentials, discovered systems and other customizations implemented on a CMS. In addition, collected data relating to performance, utilization, events, and status can be migrated. Some of this data is stored in databases 120, while other data can be stored in plug-in specific files, e.g., files 124, 126, 128 respectively for plug-ins 114, 116, and 118.

Framework 107 includes, for each plug-in 114, 116, 118, a respective set of archive/migration rules, e.g., 134, 136, 138. These rules are applied during archiving/migration operations, e.g., backup/export and restore/import. It is these rules that determine what data is to be replaced, added, deleted, rearranged, and otherwise transformed. The rules can be stored in the form of XML (Extensible Markup Language) files. These rule XML files refer to migration configuration XSD (XML Schema Definition) file 144, which is used in parsing the XML files.

During a backup/export operation involving export tool 111, data in databases 120 associated with a plug-in is converted to an exchange format such as "comma-separated values" (CSV). In alternative embodiments other forms of table-data files are used. CSV files 214, 216, and 218 are created for plug-ins 114, 116, and 118. Note, there can be zero, one, or more CSV files for each plug-in. In addition, zero, one or more directories and other files, e.g., configuration and log files, can be collected for each plug-in. For example, files 124, 126, and 128 can be collected for plug-ins 114, 116, and 118 respectively, yielding files 224, 226, and 228 respectively. The CSV and other files are encapsulated in zip files 234, 236, and 238 respectively for plug-ins 114, 116, and 118.

Each zip file 234, 236, 238 can include a respective manifest 244, 246, 248 specifying how to use the zip file. The individual zip files 234, 236, and 238 are encapsulated in a top-level zip file 230, which has its own manifest 240. Manifest 240 can, for example, indicate version numbers for the framework and plug-ins. Manifests 244, 246, and 248 can indicate an order in which the associated CSV and other files are to be processed.

In this case, migration involves exporting from a source CMS 100 to create an archive, represented by top-level zip file 230, and then importing from the archive zip 230 to a target CMS 300. The exporting is managed by a migration framework 307 and, more specifically, import tool 312 of migration tools 310 (which also include export tool 311) on target CMS 300. As this suggests, migration framework 307 is installed on CMS 300 prior to import. Likewise, plug-ins corresponding to the plug-ins on source CMS 100 are installed prior to import. Thus, framework 307 includes a core-management plug-in 314 and ancillary plug-ins 316 and 318. In addition, database programs and databases 320 (which may be unpopulated) are installed on the target CMS prior to import.

Depending on the scenario, target CMS 300 can be the same hardware as or different hardware from CMS 100. In either case, the management programs on target CMS 300 can be the same or different versions of or counterparts of those on source CMS 100. For example, a plug-in or a database program on or used by target CMS 300 can represent an upgrade over its counterpart on source CMS. "Counterpart" herein encompasses crossgrades to competitive programs, e.g., from an SQL database to an Oracle database.

Once import is complete, target CMS 300 is, in broad outline, a replica of source CMS 100. Thus, CMS 300 can include processors 301, communications (I/O) devices 303, and computer-readable storage media 305, migration framework 307, tools 310, databases 320, plug-ins 314, 316, and 318, associated files 324, 326, and 328, associated rules 334, 336, and 338, and XSD file 344. However, CMS 300 can differ from CMS in hardware, operating system version, management program versions, database versions, database structures and in the data itself.

Figure 4:
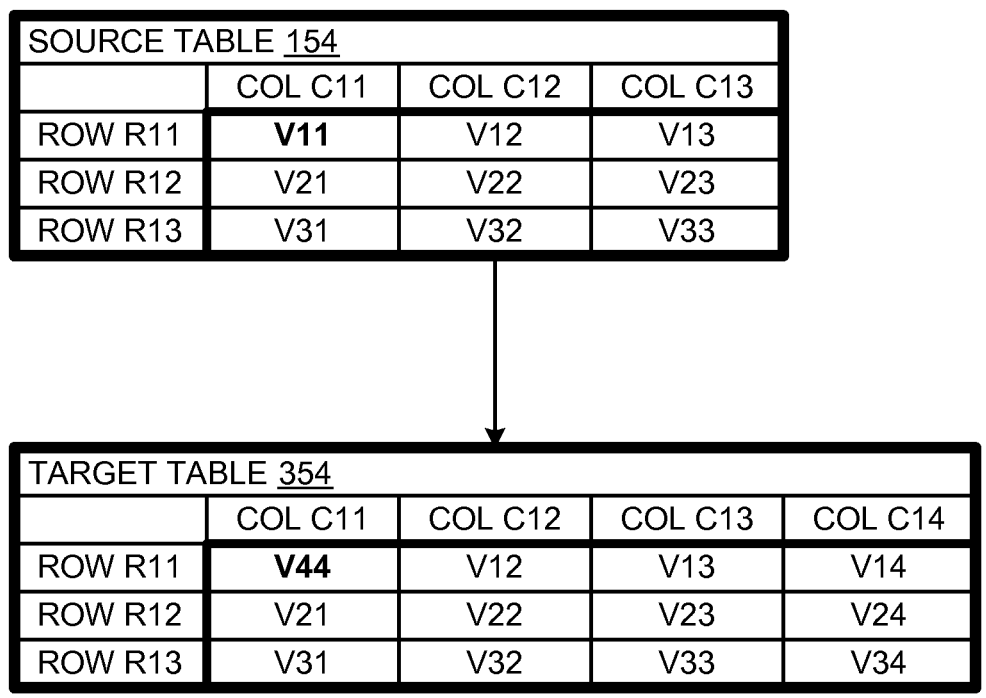
FIG. 4 depicts a transition between a source table and a target table applicable to the second system embodiment of FIG. 3.

For example, various tables and files may contain an Internet Protocol (IP) domain name and/or address for the source CMS. The source name and address can replaced with the target name and address during import. For example, in FIG. 4, a source value V11 can be an IP name of CMS 100 in table 154 of databases 120. This value V11 can be archived in zip file 230. Upon import it can be changed to value V44 in target table 354, which can be the IP domain name of target CMS 300. Note that the replacement can take place in the CSV file, e.g., CSV file 214, or it can be changed once data is entered into table 354.

In some cases, the source name and address may be deleted during export and the target name and address added during import. In such an embodiment, it is the combined export-import (backup-restore) operation that replaces data, rather than either the export or import operation alone. In some cases in which the identity of the target CMS is known at export time, Internet Protocol (IP) domain name and/or address for the source CMS can be replaced with the target Internet Protocol (IP) domain name and/or address during export.

System AP2 provides for changes during migration other than data replacement. For example, an upgrade to a core-management or other plug-in may involve a new parameter. For example, a resource-utilization program might be upgraded to track processor power consumption by managed servers as a function of their processor power-vs-performance states.

Such an upgrade can involve a new column being added to a database. For example, table 154 includes rows R11-R13 and columns C11-C13, while table 354 includes rows R11-R13 and columns C11-C14, Thus, target table 354 includes a column C14 that has no counterpart in source table 154. This, in turn, can require a rearrangement of CSV data prior to populating the database on the target CMS. In some cases, the new column will be populated with initialization or default values. Thus, while table 354 includes most of the values from table 154, e.g., V12, V13, V21, V22, V23, V31, V32, and V33, table 354 includes additional values V14, V24, and V34. As mentioned above, value V11 in table 154 is replaced by value V44 in table 354. In other instances, a column can be deleted, and rows can be inserted or deleted.

Figure 5:
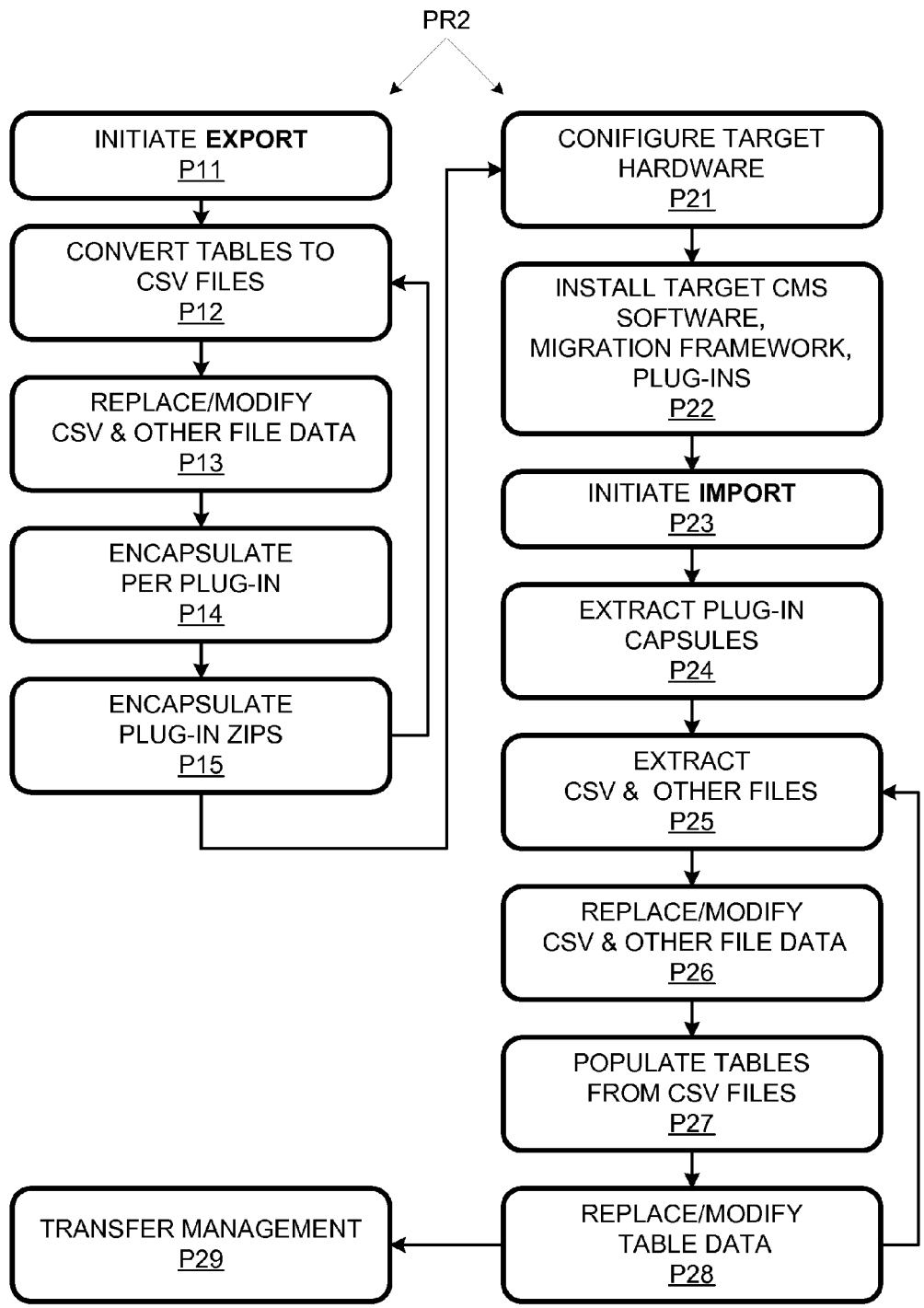
FIG. 5 is a flow chart of a migration process in accordance with a second process embodiment and implementable in the system of FIG. 3.

A process PR2 that can be implemented by system AP2 is flow charted in FIG. 5. Process segments P11-P15 relate to an export phase of a combined export/import migration operation. At process segment P11, an export operation is initiated. For example, an administrator can enter an export command on a command-line interface provided by framework 107 of FIG. 3.

Process segments P12-P15 are performed for each plug-in. At process segment P12, table (database) data required by management plug-ins is converted to CSV files. At process segment P13, data can be replaced and otherwise modified as described above. At process segment P14, the CSV and other files are encapsulated for each plug-in involved in the export. This can involve compressing the files into a zip or jar (Java Archive) format and generating and including an associated manifest. At process segment P15, the individual encapsulated files are themselves combined and encapsulated, e.g., into a top-level zip file, which can include a top-level manifest.

Prior to initiating the actual import operation, the target hardware is installed and configured at process segment P21. Likewise, software installation is performed at process segment P22. This can involve installing a migration framework, core and other plug-ins, etc. New database software can be installed on the target system or on another server in conjunction with import preparation. Executable programs are not transferred or installed as part of the actual import and export operations (e.g., in response to import and export commands).

At process segment P23, import is initiated, e.g., by an administrator entering a command on a command-line interface. At process segment P24, the plug-in capsules (zip files)

are extracted from the top-level zip file. Subsequent process segments P25-P28 are performed for each plug-in.

At process segment P25, the CSV and other files are extracted from their respective capsules (zip files). For each plug-in file, the order in which files are processed can be specified by the associated plug-in manifest. At process segment P26, CSV and other file data can be replaced and modified as described above.

At process segment P27, database tables are populated by importing the CSV data. In preparation for this populating, database tables can be initialized to initial or other default values. The import operation will overwrite some values, but others may not be overwritten. Initializing the tables clears obsolete data prior to populating the tables with the imported data.

At process segment P28, data imported into database tables can be replaced and modified according to the associated import rules. The series of process segments P25-P28 can be iterated until data for all plug-ins has been imported, at which time the import phase of the migration is complete.

In a transfer phase P29 of migration process PR2, transfer of management control is effected (either automatically or with manual input) from the source CMS to the target CMS. CMSs 100 and 300 do not manage managed servers 400 at the same time, as some plug-ins do not allow more than one CMS to monitor a managed server at any given time. Once the target CMS has assumed management control, migration is complete.

The order in which process segments are implemented is constrained by apparent logical dependencies; otherwise, the order of implementation can vary from the foregoing description. Likewise, data can be replaced in both export and import phases, or just one of the phases. Additionally, data can be added and deleted by the process. Also, data can be rearranged, e.g., in preparation for entry into a new database table structure. Furthermore, data can be transformed, e.g., compressed, decompressed, encrypted, decrypted, etc.

Herein, a "system" is a set of interacting elements, wherein the elements can be, by way of example and not of limitation, mechanical components, electrical elements, atoms, instructions encoded in storage media, and process segments. In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon are within the scope of the following claims.

What is claimed is:

1. A process comprising:
   managing plural managed servers by a source management server using management data distributed among plural source files;
   exporting said management data from said source management server so that said management data is encapsulated by an encapsulating file;
   importing said management data to a target management server by extracting said management data into plural target files, at least one of said exporting and importing including replacing some of said management data so that the management data on said target management server differs from the management data on said source management server; and
   transferring management so that said plural managed servers are managed by said target management server.

2. A process as recited in claim 1 wherein some of said management data is replaced during said exporting, said sources plural source files including at least one configuration file and at least one database.

3. A process as recited in claim 1 wherein said some of said management data is replaced during said importing.

4. A process as recited in claim 1 wherein said some of said management data is replaced during said exporting and during said importing.

5. A process as recited in claim 1 wherein the data that is replaced includes an Internet Protocol name, an Internet Protocol address, and/or an encryption key.

6. A process as recited in claim 1 wherein said exporting and importing collective cause a target table structure in which some of said management data is stored on said target management server to differ from a source table structure from which some of said management data was stored on said source management server.

7. A process as recited in claim 1 wherein the management data that is replaced is in or is imported from a comma-separated value file.

8. A system comprising:
   a source central management server to manage managed servers using management data distributed among plural source files, said source central management server including hardware and an export migration tool for exporting said management data so that it is encapsulated in an encapsulating file; and
   a target central management server to manage said managed servers using said management data, said target management server including hardware and an import migration tool for importing said management data by extracting it from said encapsulating file and distributing said management data among plural target files, at least one of said migration tools being configured to replace some of said management data so that the management data on the target central management server differs from the management data on the source central management server.

9. A system as recited in claim 8 wherein said migration tools are configured to convert between comma-separated value files and database values and to replace values in said comma-separated value files.

10. A system as recited in claim 8 wherein said import migration tool is configured to replace some of said management data during an import operation.

11. A system as recited in claim 8 the replacing some management data includes replacing a source central-management server Internet-Protocol domain name in said management data with a target central management server Internet-Protocol name.

12. A system as recited in claim 8 wherein, said migration tools are collectively configured to rearrange management data in a comma-separated value file to accommodate a target table structure that differs from a source table structure from which the comma-separate value file was generated by said export migration tool.

13. A system as recited in claim 8 wherein said exporting includes encapsulating plural encapsulated data files, each of said encapsulated data files corresponding to a respective plug-ins on said source central management server.

14. A system as recited in claim 13 wherein said central management servers are encoded with a set of rules for each of said plug-ins, each of the sets of rules specifying what, if any, data of the respective plug-in is to be replaced during the exporting and importing.

15. A system as recited in claim 14 wherein at least one of said rules calls for changing a value in a table imported from an archive file.

16. A system comprising computer-readable storage media encoded with code that causes hardware to:
   manage managed servers using management data distributed among plural files; and
   replace some of said management data in the course of a migration of said management data from a source central management server via an file encapsulating said management data to a target central management server so that the management data on the target management server differs from the management data on the source management server.

17. A system as recited in claim 16 wherein said importing includes rearranging data in a table-data file to accommodate differences between a structure of a target table and a structure of a source table from which the data values were exported.

18. A system as recited in claim 17 wherein said table-data file is a comma-separated data file.

19. A system as recited in claim 16 wherein said importing includes replacing some management data.

20. A system as recited in claim 16 wherein said importing and exporting collectively include replacing a source Internet Protocol address with a target Internet Protocol address.

\* \* \* \* \*

UNITED STATES PATENT AND TRADEMARK OFFICE
CERTIFICATE OF CORRECTION

PATENT NO. : 9,292,547 B1
APPLICATION NO. : 12/693925
DATED : March 22, 2016
INVENTOR(S) : Geoffery A. Schunicht et al.

Page 1 of 1

It is certified that error appears in the above-identified patent and that said Letters Patent is hereby corrected as shown below:

Claims

In column 6, line 3, in Claim 2, delete "sources plural" and insert -- plural --, therefor.

In column 6, line 53, in Claim 12, delete "wherein," and insert -- wherein --, therefor.

Signed and Sealed this
Twenty-eighth Day of June, 2016

Michelle K. Lee
*Director of the United States Patent and Trademark Office*